United States Patent Office 3,214,278
Patented Oct. 26, 1965

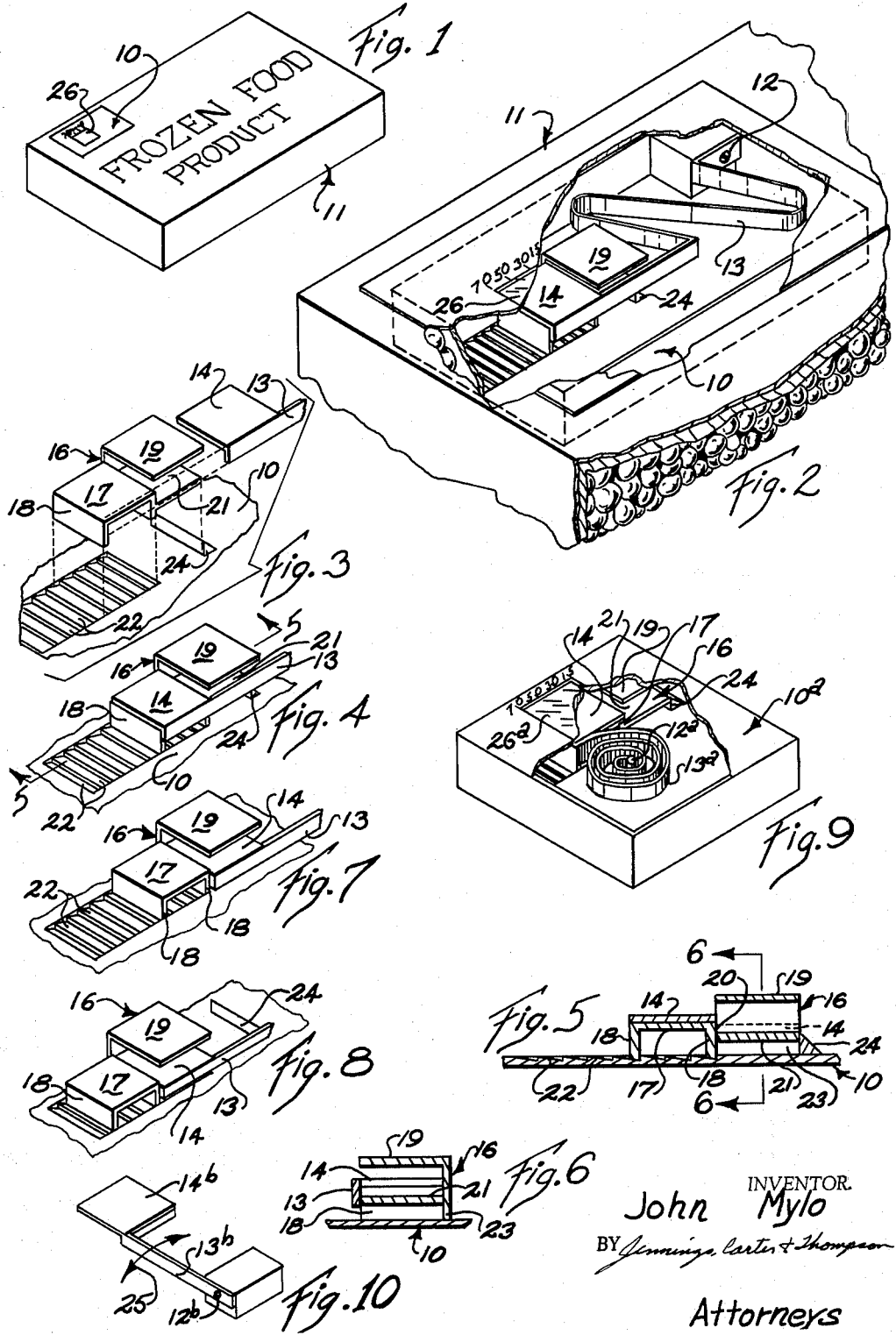

3,214,278
TEMPERATURE SENSING DEVICE
John Mylo, 401 12th St., Athens, Ala.
Filed May 15, 1963, Ser. No. 280,610
10 Claims. (Cl. 99—192)

This invention relates to a temperature sensing device and more particularly to visual means for indicating whether or not the temperature of a stored product has increased beyond a predetermined point and has exceptional utility in the detection and indication of temperature change of packaged and stored materials, such as frozen food products, medicines, chemicals and other materials which are rendered unuseful or unsafe for their intended purpose where the temperature thereof increases beyond a predetermined point.

An object of my invention is to provide a temperature sensing device which is entirely mechanical in operation and one which is compact whereby it takes up a minimum of space, thus adapting the device to be mounted within the environment of the product or material, such as within boxes, cartons or any other type of containers without any significant change in current packaging techniques.

Another object of my invention is to provide a temperature sensing device of the character designated which indicates a temperature change in a simple and efficient manner and one which is tamper-proof.

A further object of my invention is to provide a temperature sensing device of the character designated which shall be simple of construction, economical to manufacture and one which is particularly adapted for indicating whether or not frozen foods and the like have been thawed to a temperaturre which causes deterioration to an undesirable or dangerous point.

As is well known in the art to which my invention relates, frozen foods are much more perishable after they have been thawed than other food products. It is the usual practice to quick-freeze such products and then ship the same to various markets and retail outlets where they are stored in refrigerated units until disposed of for consumption. These frozen products must be maintained without interruption in a completely frozen state until they reach the ultimate consumer. Also, many medicinal and pharmaceutical supplies, such as vaccines, must be maintained below a predetermined temperature without interruption if such supplies are to be safe for subsequent use.

Sometimes, by accident or other cause, frozen products are permitted to thaw or the temperature thereof rises above the danger point. Although the temperature might be subsequently reduced to a safe level, the medicinal or food value of the product, as the case may be, may have been destroyed. For example, a frozen food product may thaw during shipment or storage and then be refrozen prior to delivery to the ultimate consumer. Heretofore, various types of temperature indicators have been proposed but have found limited acceptance due to the fact that they are complicated in structure or require the use of chemical compounds or the like to indicate that the temperature of the product has been elevated to a predetermined temperature after being cooled to a safe temperature.

Briefly, my improved temperature sensing device comprises a thermal responsive bimetallic element having one end thereof anchored to a supporting structure and the other end thereof connected to a movable member whereby the movable member moves in one direction upon an increase in temperature and moves in another direction upon a decrease in temperature. Another movable member is mounted adjacent the first mentioned movable member and is limited to movement in a direction which indicates an increase in temperature. The movable members are so constructed that they are detachably connected to each other upon movement of the first mentioned movable member a predetermined distance in a direction which indicates a decrease in temperature whereby both movable members move in a direction which indicates an increase in temperature upon subsequent movement of the first mentioned movable member in the direction which indicates an increase in temperature. Accordingly, my improved temperature sensing device indicates whether or not the product has been cooled to a predetermined temperature. Also, my sensing device indicates whether or not the temperature of the product has been elevated after the predetermined temperature has been reached. Furthermore, my sensing device indicates the maximum temperature reached after the product has been cooled to the predetermined temperature.

Apparatus embodying features of my invention is illustrated in the accompanying drawing, forming a part of this application, in which:

FIG. 1 is an isometric view showing my temperature sensing device mounted in a frozen food container;

FIG. 2 is a fragmental view, partly broken away and in section, showing the various components of the temperature sensing device;

FIG. 3 is an isometric exploded view, showing parts of the temperature sensing device;

FIG. 4 is a fragmental isometric view showing the temperature sensing device in the position assumed prior to initial reduction of the temperature;

FIG. 5 is a view taken generally along the line 5—5 of FIG. 4;

FIG. 6 is a sectional view taken generally along the line 6—6 of FIG. 5;

FIG. 7 is a fragmental isometric view showing the position of the sensing device after the temperature has been reduced to a predetermined point;

FIG. 8 is a fragmental isometric view showing the position of the sensing device upon an increase in temperature after the initial reduction of the temperature to a predetermined point;

FIG. 9 is an isometric view, partly broken away, showing a modified form of my invention in which a bimetallic element in the form of a spiral coil is employed; and FIG. 10 is an isometric view showing a further modified form of my invention in which the bimetallic element is in the form of an elongated member whereby the movable member moves therewith in a direction transversely of the free end of the bimetallic element.

Referring now to the drawing for a better understanding of my invention, I show my improved temperature sensing device as being mounted in a housing 10 which is adapted to be inserted within a food carton or the like indicated generally at 11, as shown in FIGS. 1 and 2. Anchored to the housing 10 by a pivot screw 12 is one end of a bimetallic element 13 which may be in the form of an elongated member having at least one loop therein. The end of the bimetallic element 13 opposite the end thereof anchored by the screw 12 carries a laterally extending movable member 14 which is adapted to move with the bimetallic element 13 in response to an increase or decrease in temperature. Preferably, the movable member 14 extends laterally of the bimetallic element 13, as shown in FIG. 3, to define an included angle of approximately 90°.

Mounted within the housing 10 adjacent the movable member 14 is a second movable member 16 which comprises a support member 17 having depending legs 18. Formed integrally with the movable member 16 alongside the support member 17 is a laterally extending indicating member 19 which is supported at an elevation above support member 17, as shown. Also, formed integrally with the movable member 16 below the indicating member 19 is a laterally extending support 21 which is positioned at an elevation below the surface of the support member 17, as shown in FIG. 5. Accordingly, the movable member 14 is adapted to be supported by the support member 17, as shown in FIGS. 2, 4 and 5 prior to being cooled to a predetermined temperature. On the other hand, upon reducing the temperature, the bimetallic element 13 moves the movable member 14 beneath the indicating member 19 onto the support member 21, as shown in FIGS. 7 and 8, whereby the indicating member 14 moves to the dotted line position shown in FIG. 5. Since the support member 21 is at a lower elevation than the support member 17, a vertical restraining member 20 is provided whereby the entire movable member 16 is moved with the movable member 14 upon increasing the temperature after the member 14 has moved into restrained relationship with the movable member 16. That is to say, any subsequent movement of the movable member 14 after dropping onto the supporting surface 21 also moves the movable member 16.

The movable member 16 is limited to movement toward the left, as viewe in FIG. 5. To accomplish this, a plurality of upwardly inclined members 22 are provided adjacent the bottom wall of the housing 10, as shown. The upper surfaces of the members 22 are inclined toward the left as viewed in FIG. 5, whereby the movable member 16 can move only in a direction in response to an increase in temperature. Also, the lower surface of the leg members 18 slope downwardly and rearwardly of the direction of movement thereof whereby they engage the inclined members 22. A vertical member 23 depends from the support member 21, as shown in FIGS. 5 and 6 in position to engage the bottom of the housing 10. Mounted on the bottom wall of the housing 10 in position to position the movable member 16 is a stop member 24.

A suitable transparent member 26 is provided in the top of the housing 10 in position to expose the movable member 14 when the movable member 14 is in the position shown in FIG. 4. That is to say, the stop member 24 positions the movable member 16 whereby its support member 17 and the movable member 14 are both positioned beneath the transparent member 26 in the housing 10. Upon movement of the movable member 14 beneath the indicating member 19, the supporting surface 17 is exposed through the transparent member 26. On the other hand, movement of the movable member 14 after falling into the recess beneath the indicating member 19 moves the indicating member 19 beneath the transparent member 26. Preferably, the surfaces 14, 17 and 19 are of different colors whereby they indicate which member is beneath the transparent member 26.

From the foregoing description, the operation of my improved apparatus shown in FIGS. 1-8 will be readily understood. Prior to initial reduction in the temperature of the container 11, the temperature indicating device assumes the position shown in FIGS. 2 and 4 whereby the movable member 14 is supported directly above the support 17. Accordingly, only the surface 14 is exposed through the transparent member 26.

Upon reduction in temeprature, the bimetallic element 13 moves the movable member 14 to a position beneath the indicating member 19 whereupon it falls onto the support member 21. That is, upon freezing the contents of the container 11 or decreasing the temperature to a predetermined point, the movable member 14 moves off the support member 17 into restrained relation with the movable member 16. In this position, only the supporting surface 17 is exposed through the transparent member 26, thus indicating that the desired or predetermined temperature has been reached.

Any subsequent movement of the bimetallic member 13 in response to an increase in temperature causes the depending legs 18 of the support member 16 to move over the inclined members 22 whereby the indicating member 19 moves beneath the transparent member 26, thus indicating that there has been an increase in temperature and at the same time indicates the amount of increased temperature. Accordingly, the position of the indicating member 19 beneath the transparent member 26 indicates the maximum increase in temperature after the desired temperature has been reached. Suitable indicia may be provided on the housing 10 adjacent the transparent member 26, as shown, to indicate the position of the indicating member 19 whereby the exact degree of temperature increase is indicated beneath the transparent member 26. Since the movable member 16 is limited to movement in a direction to indicate an increase in temperature, a subsequent decrease in temperature will not change the position of the indicating member 19 beneath the transparent member 26.

Referring now to FIG. 9 of the drawing, I show a modified form of my invention in which a bimetallic element in the form of a spiral coil $13^a$ is employed. One end of the bimetallic element $13^a$ is anchored to a pin $12^a$ while the other end thereof is connected to a movable member 14 which is associated with a second movable member 16. The movable members are identical in structure to the movable members 14 and 16 described hereinabove. The temperature sensing device shown in FIG. 9 is mounted in a suitable housing $10^a$ having a transparent member $26^a$ therein in position to expose selectively the surfaces 14, 17 and 19, as described hereinabove. In view of the fact that the operation of the device shown in FIG. 9 is identical to the operation of the apparatus shown in FIGS. 1–8, with the exception of the bimetallic element $13^a$, no further description thereof is deemed necessary.

In FIG. 10 of the drawing I show a bimetallic element $13^b$ in the form of an elongated member which is anchored at one end to a support by a pivot pin $12^b$. Mounted adjacent the other or free end of the bimetallic element $13^b$ is a movable member $14^b$ which moves with the bimetallic element in the direction of the arrows 25. The movable member $14^b$ is mounted in position to move from a position over the support member 17 to a position over the support member 21 as described hereinabove. Since the member $14^b$ moves in an arcuate path, the support members 17 and 21 could be mounted in an arcuate path relative to each other, if desired. However, by providing a member $13^b$ of a sufficient length, the member $14^b$ moves in a generally straight line.

From the foregoing, it will be seen that I have devised an improved temperature sensing device which indicates the temperature of the container 11 prior to being reduced to a predetermined temperature and then indicates that the predetermined temperature has been reached. Any subsequent increase in temperature is also indicated due to the fact that the bimetallic element moves the indicating member 19 beneath the transparent member in response to an increase in temperature after the initial predetermined temperature has been reached. Accordingly, any time there is a thawing of the contents or an increase in temperature of the contents of the container 11, such increase in temperature is registered beneath the transparent member 26 whereby the maximum temperature reached is clearly visible beneath the transparent member 26. By providing a sealed-in unit within the container 11, together with means to limit movement of the indicating member 19 to a direction which indicates an increase in temperature, my improved apparatus is tamper proof and will always indicate the maximum temperature reached after the initial predetermined temperature has been obtained.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A temperature sensing device comprising:
 (a) a thermal-responsive bimetallic element having one end thereof anchored,
 (b) a first movable member carried by the other end of said bimetallic element and adapted to move therewith in response to temperature changes whereby said first movable member moves in one direction upon an increase in temperature and moves in another direction upon a decrease in temperature,
 (c) a second movable member mounted adjacent said first movable member and limited to movement in said one direction, and
 (d) means detachably connecting said first movable member to said second movable member upon movement of said first movable member a predetermined distance in said another direction to thereafter move said second movable member in said one direction upon movement of said first movable member in said one direction whereby the amount of movement of said second member in said one direction indicates the temperature increase after said first movable member has moved said predetermined distance in said another direction.

2. A temperature sensing device as defined in claim 1 in which the second movable member carries an indicating member and said first movable member is adapted to move from a position alongside said indicating member to a position beneath said indicating member upon movement of said first movable member said predetermined distance in said another direction.

3. A temperature sensing device as defined in claim 1 in which the bimetallic element is an elongated member having at least one loop-like portion therein.

4. A temperature sensing device as defined in claim 1 in which the bimetallic element is a spiral coil.

5. A temperature sensing device comprising:
 (a) a thermal-responsive bimetallic element having one end thereof anchored,
 (b) a first movable member carried by the other end of said bimetallic element and adapted to move therewith in response to temperature changes whereby said first movable member moves in one direction upon an increase in temperature and moves in another direction upon a decrease in temperature,
 (c) a second movable member mounted adjacent said first movable member and limited to movement in said one direction,
 (d) a support member carried by said second movable member adapted to support said first movable member prior to movement of said first movable member a predetermined distance in said another direction,
 (e) an indicating member carried by said second movable member in position to extend over said first movable member after said first movable member has moved said predetermined distance in said another direction, and
 (f) means detachably connecting said first movable member to said second movable member upon movement of said first movable member said predetermined distance in said another direction to thereafter move said second movable member in said one direction upon movement of said first movable member in said one direction whereby the amount of movement of said indicating member in said one direction indicates the temperature increase after said first movable member has moved said predetermined distance in said another direction.

6. A temperature sensing device as defined in claim 5 in which said second movable member is provided with a recessed portion beneath said indicating member for receiving said first movable member to detachably connect said first movable member to said second movable member upon movement of said first movable member said predetermined distance in said another direction.

7. A temperature sensing device as defined in claim 5 in which said first movable member, said support member and said indicating member are different in appearance whereby the relative positions thereof may be determined by viewing the original position of said support member.

8. A temperature sensing device comprising:
 (a) a housing having a transparent area in one surface thereof,
 (b) a thermal-responsive bimetallic element having one end thereof anchored to said housing,
 (c) a first movable member carried by the other end of said bimetallic element and adapted to move therewith in response to temperature changes whereby said first movable member moves in one direction upon an increase in temperature and moves in another direction upon a decrease in temperature,
 (d) a second movable member mounted adjacent said first movable member,
 (e) means to limit movement of said second movable member to movement in said one direction,
 (f) a support member carried by said second movable member adapted to support said first movable member beneath said transparent area prior to movement of said first movable member a predetermined distance in said another direction,
 (g) an indicating member carried by said second movable member in position to extend over said first movable member after said first movable member has moved said predetermined distance in said another direction, and
 (h) means detachably connecting said first movable member to said second movable member upon movement of said first movable member said predetermined distance in said another direction to thereafter move said second movable member in said one direction beneath said transparent area upon movement of said first movable member in said one direction whereby the amount of movement of said indicating member in said one direction indicates the temperature increase after said first movable member has moved said predetermined distance in said another direction.

9. A temperature sensing device as defined in claim 8 in which the means to limit movement of said second movable member to movement in said one direction comprises an elongated member having a plurality of upwardly extending spaced apart surfaces inclined in said one direction and disposed to engage depending members carried by said second movable member.

10. A temperature sensing device as defined in claim 8 in which a stop member is carried by said housing in position to engage said second movable member and position said support member beneath said transparent area.

References Cited by the Examiner

UNITED STATES PATENTS 2,866,338 12/58 Munchervan _____ 73—363.7
2,966,261 12/60 Bradbury _____ 73—358

LOUIS R. PRINCE, *Primary Examiner.*